W. F. Ketchum.
Mower
Patented Jul 10, 1847
Nº 228
Reissued Jan. 11, 1853
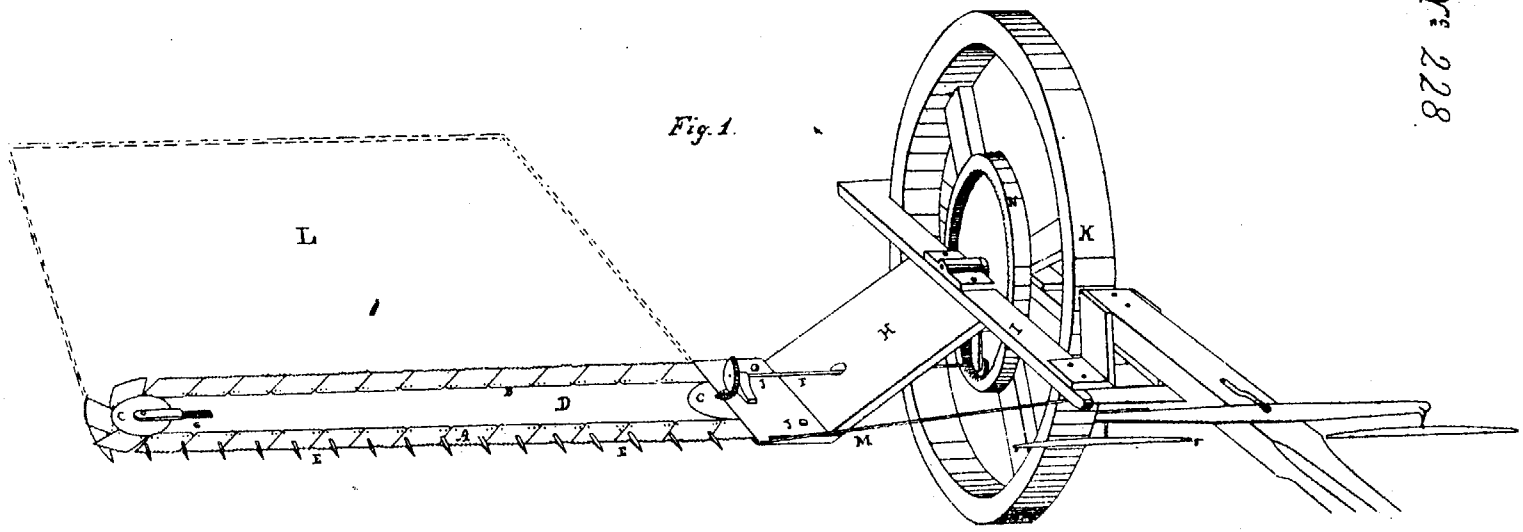
Fig. 1.
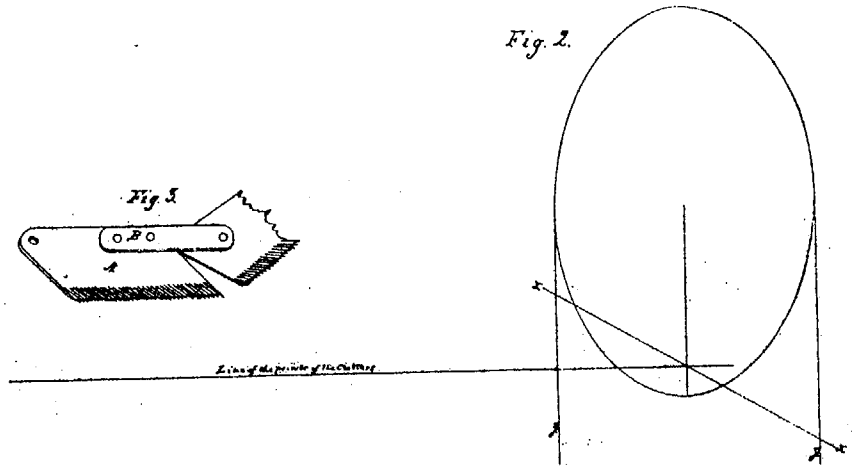
Fig. 2.
Fig. 3.

UNITED STATES PATENT OFFICE.

WM. F. KETCHUM, OF BUFFALO, NEW YORK.

IMPROVEMENT IN REAPING-MACHINES.

Specification forming part of Letters Patent No. 5,189, dated July 10, 1847; Reissue No. 206, dated October 21, 1851; Reissue No. 228, dated January 11, 1853.

*To all whom it may concern:*

Be it known that I, WILLIAM F. KETCHUM, of Buffalo, in the county of Erie and State of New York, have invented a new, useful, and Improved Grass-Mowing Machine; and I do hereby declare that the following is a full, clear, and exact description thereof, reference being had to the accompanying drawings and letters marked therein, forming a part of this specification.

Of said drawings, Figure 1 is an isometrical view; Fig. 2, a diagram showing the relative position of the cutters to the driving-wheel, and Fig. 3 a separate view of two of the links of the sickle-edged cutter.

My invention consists, first, in the use or employment of a crooked arm or coupling-piece, (which connects the cutter-bar to the frame,) by which the cutters are brought parallel with and close to the surface of the ground, never mind what the diameter of the driving-wheel is, and the loose and cut grass lying between the heel of the cutters and driving-wheel is prevented from clogging the cutters or retarding the free passage of the machine over the ground; second, in the relative position of the crooked arm or coupling-piece and the cutter-bar to the driving-wheel—to wit, bringing them to or nearly to a plane perpendicular to the axis of the driving-wheel, or, in other words, attaching them to the frame, so that a line drawn touching the cutting-points of the cutters would intersect or cross to the right or left of a vertical radius, or a radius drawn to what is technically called the "tread" of the wheel, or said line of the cutters crossing any point within the line *x x*, Fig. 2, either to the right or left of said vertical radius, and falling within the extreme circumference of the driving-wheel, (shown by the lines *y y*,) so that the vibration of the frame of the machine occasioned by the movement of the animals drawing it as it passes over the inequalities of the ground shall produce little or no deviation in the elevation of the cutters, which desideratum cannot be obtained if the cutters occupy a position or line remote from the center or axis of the driving-wheel; and, third, in an endless-chain cutter consisting of a series of serrated or sickle-edged cutters linked together, and the application and arrangement of it in such a way as causes it to run around pulleys with the backs of the cutters against the pulleys, the pulleys having their bearings in the cutter-bar and the cutters being covered all over except their cutting-edges.

In said drawings, H is the crooked arm or coupling-piece. It may be made of cast or wrought metal. One end of it is fastened permanently to the frame I in any well-known manner, and the other end has a sort of open mortise in it, in which the cutter-bar is fastened by bolts J J. It (the coupling-piece) should be long enough to allow the cutters to swing the proper distance from the surface of the ground, and it should be so constructed as to be at about the angle to the cutters and frame represented in the drawings, so that it will pass freely over the loose and cut grass lying between the heel of the cutters and the driving-wheel. Thus it will be seen that with this arrangement and attachment of the cutter-bar with the frame the cutters are always parallel with and close to the surface of the ground, although the surface of the ground may be irregular and the center of the driving-wheel elevated two or more feet. The elevation of the cutters from the ground must under all circumstances be the same, for as the driving-wheel passes over the elevated and depressed portions of the ground the cutters will be elevated and depressed accordingly. The endless belt of cutters, as seen at A, is made of iron or steel segments or pieces about three or four inches long, and connected together by lapping the longest pieces on top of the short pieces. (Seen at B.) The ends of the longest pieces meet in the center of the short pieces, and the short pieces are riveted fast with two rivets at one end, and the other end is riveted to the other long piece with one rivet, which is the joint or pivot on which the pieces work or turn. The inner corners of the longest pieces are rounded off, so that the belt may bend or work around the pulleys. (Seen at *c c*.) The belt of the cutters is placed on the rack-piece D flatwise and around the pulleys edgewise; or, rather, the back part of the cutter is against the pulleys and the cutting-edge projecting from them between the rack-teeth. The rack-teeth are fastened to the rack under the belt of cutters, and are seen at E E projecting out in front of the cutting-edge. The inner corners of the longest pieces or segments of the belt of cutters, being rounded, allows the belt to yield and work around the pulleys edgewise. The pulley nearest the driving-wheel is propelled by cogs on the shaft F, which shaft is propelled by the main cog-wheel. (Seen at N.) The other pulley yields to the uneven surface of the belt by a spring, G, bearing against its boxing.

Having thus fully described my invention, what I claim, and desire to secure by Letters Patent, is—

1. The crooked arm or coupling-piece, separate or in combination with the cutter-bar, whether both be composed of one, two, or more pieces.

2. Attaching, supporting, and sustaining said cutter-bar to the frame relatively to the driving-wheel, substantially as herein described and represented in Fig. 2, and for the purpose set forth.

3. The endless-chain sickle-edge cutter, in combination with the pulleys and rack-teeth, arranged and operating substantially as, in the manner, and for the purpose set forth.

In testimony whereof I have hereunto signed my name before two subscribing witnesses.

WM. F. KETCHUM.

Witnesses:
I. S. SMITH,
H. H. YOUNG.